United States Patent
Balan et al.

(10) Patent No.: US 9,644,347 B2
(45) Date of Patent: May 9, 2017

(54) RETENTION LOBE FOR GROUND ENGAGING TIP

(71) Applicant: CATERPILLAR INC., Peoria (IL)

(72) Inventors: Mihai M. Balan, Dunlap, IL (US); Douglas Serrurier, Morton, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 14/824,749

(22) Filed: Aug. 12, 2015

(65) Prior Publication Data

US 2017/0044740 A1 Feb. 16, 2017

(51) Int. Cl.
*E02F 9/28* (2006.01)
*B29C 67/00* (2017.01)
*G05B 19/4099* (2006.01)
*B33Y 50/02* (2015.01)

(52) U.S. Cl.
CPC ........ *E02F 9/2825* (2013.01); *B29C 67/0088* (2013.01); *E02F 9/285* (2013.01); *E02F 9/2816* (2013.01); *G05B 19/4099* (2013.01); *B33Y 50/02* (2014.12); *G05B 2219/35134* (2013.01); *G05B 2219/49007* (2013.01)

(58) Field of Classification Search
CPC ..... E02F 9/2825; E02F 9/2841; E02F 9/2833; E02F 9/2883; E02F 9/2816; E02F 9/285; Y10T 403/589; Y10T 403/7075; B29C 67/008; B33Y 50/02; G05B 19/4099; G05B 2219/3513; G05B 2219/49007
USPC ............. 37/446, 452–460; 172/701.1–701.3; 403/376
See application file for complete search history.

(56) References Cited

U.S. PATENT DOCUMENTS

| | | | |
|---|---|---|---|
| 7,762,015 B2 * | 7/2010 | Smith .................. | E02F 9/2825 37/455 |
| D706,840 S * | 6/2014 | Renski ......................... | D15/29 |
| 8,943,717 B2 | 2/2015 | Renski et al. | |
| 2003/0101627 A1* | 6/2003 | Robinson .............. | E02F 9/2825 37/456 |
| 2005/0011089 A1 | 1/2005 | Duke | |
| 2012/0055052 A1* | 3/2012 | Campomanes ....... | E02F 9/2825 37/456 |
| 2013/0086827 A1 | 4/2013 | Renski et al. | |
| 2013/0145659 A1 | 6/2013 | Lahood et al. | |

FOREIGN PATENT DOCUMENTS

WO 2012075531 6/2012

* cited by examiner

*Primary Examiner* — Robert Pezzuto
(74) *Attorney, Agent, or Firm* — Finnegan, Henderson, Farabow, Garrett & Dunner, LLP (57) ABSTRACT

A retention lobe for a ground engaging tip may include a lobe base having a base outline, wherein at least a portion of the base outline may lie in a base plane. The base outline may include a front base edge and a rear base edge opposite the front base edge. The retention lobe may also include a lobe outer surface spaced from the lobe base and extending from the front base edge to the rear base edge. The lobe outer surface may include a front lobe outer surface extending from the front base edge obliquely relative to the base plane and toward the rear base edge. The lobe outer surface may further include a rear lobe outer surface extending obliquely relative to the front lobe outer surface, such that the rear lobe outer surface tapers relative to the front lobe outer surface toward the base plane.

23 Claims, 6 Drawing Sheets

RETENTION LOBE FOR GROUND ENGAGING TIP

TECHNICAL FIELD

The present disclosure relates to retention lobes, and more particularly, to retention lobes for ground engaging tips of ground engaging tooth assemblies.

Machines may be used to dig into a work material such as earth or rock and move loosened work material from one place to another at a worksite. Such machines typically include a chassis housing a power source and one or more mechanical linkages for controlling movement and operation of implements for performing tasks such as excavating and transferring the work material. The linkages may be capable of raising and lowering the implements, and rotating the implements to engage the work material in a desired manner. For example, in the earth moving applications, the implements of the machine may include a bucket having an edge for penetrating into the surface of the work material and excavating it.

To facilitate the earth moving process and prolong the useful life of the implement, a plurality of tooth assemblies may be spaced along and attached to the base edge of the implement. The tooth assemblies project forward from the base edge and act as a first point of contact to penetrate the work material, which may reduce the amount of wear of the base edge of the implement. In this manner, the implement may remain usable through multiple cycles of replacement tooth assemblies. However, it may be desirable to replace the tooth assemblies because they are subjected to wear and are sometimes damaged by repetitive engagement with the work material. Depending on the uses of the implement and/or the characteristics of the work material, it may also be desirable to Change the tooth assemblies to provide tooth assemblies having a shape or other characteristic consistent with the desired use and/or work material to effectively use the implement.

Some ground engaging tooth assemblies include an adapter configured to couple the ground engaging tooth assembly to the base edge of a ground engaging implement. Such adapters may also be configured to be coupled to a ground engaging tip via a retention mechanism. Because it is sometimes desirable to replace the ground engaging tip without necessarily replacing the associated adapter, for example, due to wear or damage to the tip, it is desirable to protect the retention mechanism so that the ground engaging tip may be removed and replaced. In addition, it may be desirable to configure the protection of the retention mechanism in such a way that it does not interfere with the flow of the work material over and around the ground engaging tooth assembly during use.

An example of an implement tooth assembly is disclosed in U.S. Pat. No. 8,943,717 B2 to Renski et al. ("the '717 patent"). In particular, the '717 patent discloses a ground engaging tip of a tooth assembly for a base edge of a ground engaging implement. The tooth assembly of the '717 patent includes an adapter configured for attachment to a base edge of the ground engaging implement and having a forwardly extending adapter nose. The ground engaging tip may have a configuration for providing additional wear material for use in earth moving applications.

Although the tooth assembly disclosed in the '717 patent provides additional wear material, it may not provide desired protection of the retention mechanism that couples the ground engaging tip to the adapter. In addition, the tooth assembly may not include protection for the retention mechanism that does not interfere with the flow of work material over and around the ground engaging tooth assembly. The retention lobes disclosed herein may be directed to mitigating or overcoming one or more of these possible drawbacks.

SUMMARY

In one aspect, the present disclosure is directed to a retention lobe for a ground engaging tip. The retention lobe may include a lobe base having a base outline. At least a portion of the base outline may lie in a base plane. The base outline may include a front base edge and a rear base edge opposite the front base edge. The retention lobe may also include a lobe outer surface spaced from the lobe base and extending from the front base edge to the rear base edge. The lobe outer surface may include a front lobe outer surface extending from the front base edge obliquely relative to the base plane and toward the rear base edge. The lobe outer surface may also include an intermediate lobe outer surface spaced from the base plane and extending obliquely from the front lobe outer surface. The lobe outer surface may further include a rear lobe outer surface extending obliquely from the intermediate lobe outer surface and terminating at the rear base edge, such that the rear lobe outer surface tapers from the intermediate lobe outer surface toward the base plane.

According to another aspect, a retention lobe for a ground engaging tip may include a lobe base having a base outline, wherein at least a portion of the base outline may lie in a base plane. The base outline may include a front base edge and a rear base edge opposite the front base edge. The retention lobe may also include a lobe outer surface spaced from the lobe base and extending from the front base edge to the rear base edge. The lobe outer surface may include a front lobe outer surface extending from the front base edge obliquely relative to the base plane and toward the rear base edge. The lobe outer surface may further include a rear lobe outer surface extending obliquely relative to the front lobe outer surface, such that the rear lobe outer surface tapers relative to the front lobe outer surface toward the base plane.

According to still another aspect, a retention lobe for a ground engaging tip may include a lobe base having a base outline, wherein at least a portion of the base outline may lie in a base plane. The base outline may include a front base edge and a rear base edge opposite the front base edge. The retention lobe may also include a lobe outer surface spaced from the lobe base and extending from the front base edge to the rear base edge. The lobe outer surface may include a front lobe outer surface extending from the front base edge obliquely relative to the base plane and toward the rear base edge. The lobe outer surface may further include a rear lobe outer surface extending obliquely relative to the front lobe outer surface, such that the rear lobe outer surface tapers relative to the front lobe outer surface toward the base plane. At least one of the front lobe outer surface and the rear lobe outer surface may include abrasive resistant material.

DETAILED DESCRIPTION

The exemplary retention lobes disclosed herein may be used with any ground engaging tooth assemblies used with any ground engaging implements. For example, the exemplary retention lobes may be used with ground engaging tooth assemblies for excavating implements and/or loading implements, such as, for example, buckets for loaders and/or excavators, regardless of size. For example, ground engaging tooth assemblies may be configured to assist penetration of the implement into a work material, such as, for example, soil, rock, and/or other materials. According to some embodiments, the retention lobes may help improve the service life of the ground engaging tooth assemblies and/or implements to which the ground engaging tooth assemblies are coupled.

Figure 1:
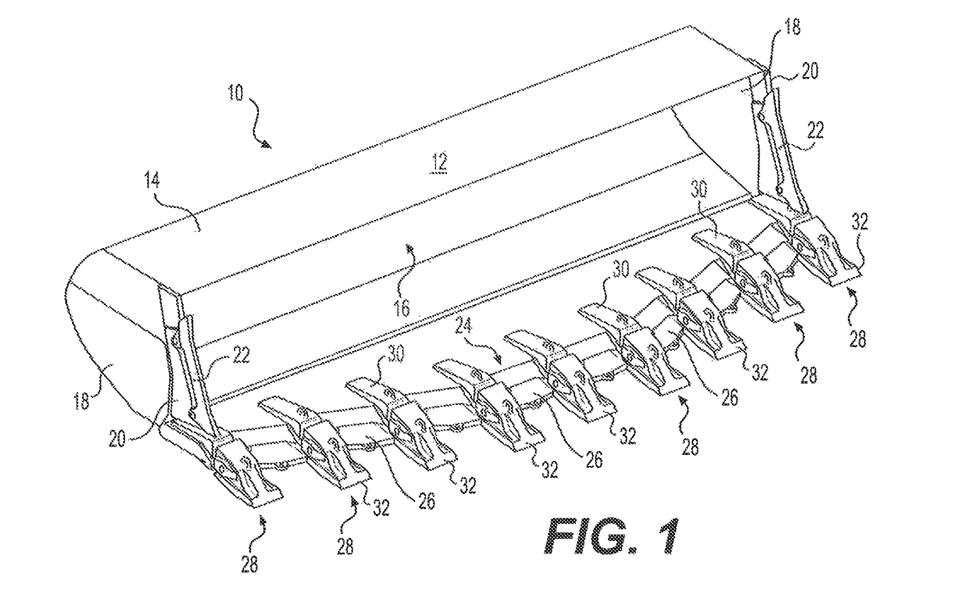
FIG. 1 is a perspective view of an exemplary embodiment of a ground engaging implement and exemplary embodiments of ground engaging tooth assemblies.

FIG. 1 shows an exemplary ground engaging implement assembly 10 including a bucket 12, which may be used to excavate and/or transfer work material from one location to another, for example, from a pile to a truck configured to haul the material to another location. In the exemplary embodiment shown, bucket 12 includes a wrapper 14 forming a receptacle 16 for holding material. Exemplary bucket 12 may also include a pair of opposing side plates 18 coupled to wrapper 14 and respective support arms 20 at leading edges of side plates 18. According to the exemplary embodiment shown, bucket 12 also includes respective corner guards 22 configured to protect the portions of support arms 20 proximal a base edge 24 of bucket 12.

In the exemplary embodiment shown, bucket 12 includes a plurality of edge protector assemblies 26 on base edge 24, and a plurality of ground engaging tooth assemblies 28. Edge protector assemblies 26 and ground engaging tooth assemblies 28 may be positioned on base edge 24 in an alternating manner, for example, as shown in FIG. 1. Edge protector assemblies 26 and ground engaging tooth assemblies 28 may be configured to protect base edge 24 and/or assist with penetration of bucket 12 into a work material.

Figure 2:
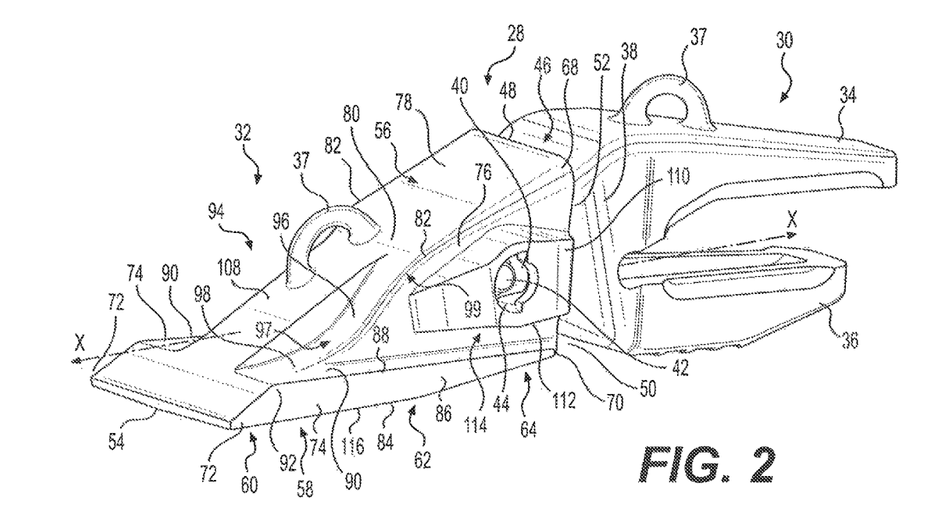
FIG. 2 is a perspective view of an exemplary embodiment of a ground engaging tooth assembly.

FIG. 2 shows a perspective view of an exemplary embodiment of ground engaging tooth assembly 28. In the exemplary embodiment shown, tooth assembly 28 includes an adapter 30 configured to be coupled to base edge 24 of bucket 12, and a ground engaging tip 32 configured to be coupled to adapter 30. For example, adapter 30 includes a top strap 34 and a bottom strap 36 configured to facilitate coupling of adapter 30 to base edge 24. Top strap 34 and/or bottom strap 36 may be coupled to base edge 24 (see FIG. 3) via any known form of coupling, such as, for example, fasteners (e.g., bolts and rivets), adhesives, and/or welding, such that adapter 30 and base edge 24 of bucket 12 do not move relative to one another during use.

Ground engaging tip 32 may be exposed a majority of impact and abrasion resulting from engagement with the work material, and thus, is susceptible to more wear and damage than adapter 30. According to some embodiments, ground engaging tip 32 may be coupled to adapter 32, worn to a desired level, and replaced without necessarily replacing adapter 30. Eventually, adapter 30 may become worn to a desired level and thereafter be replaced without necessarily replacing bucket 12 or other portions of ground engaging implement assembly 10. According to some embodiments, one or more of adapter 30 and ground engaging tip 32 may include an eye 37, as shown, to facilitate lifting and movement of adapter 30 and/or ground engaging tip 32, for example, via a hoist or other implement.

Exemplary adapter 30 shown in FIGS. 1-5 includes a retention system for securing ground engaging tip 32 to adapter 30 during use. For example, exemplary adapter 30 includes an intermediate portion 38 coupling top strap 34 and bottom strap 36 with a nose 40 of adapter 30. According to the exemplary embodiment shown, nose 40 includes projections 42 on opposite sides of nose 40. According to some embodiments, nose 40 and projections 42 of adapter 30 are configured to be received in a hollow portion of ground engaging tip 32, such that projections 42 on opposite sides of nose 40 are configured to be received in corresponding retention apertures 44 of ground engaging tip 32. According to this exemplary configuration, ground engaging tip 32 may be selectively secured to, and removed from, adapter 30. According to such embodiments, ground engaging tip 32 may be mounted to adapter 30, used until worn to a desired amount, removed, and replaced with a new or refurbished ground engaging tip having the same, a similar, or a different configuration, depending on the desired characteristics of the tip. Other configurations for coupling ground engaging tip 32 to adapter 30 are contemplated.

The exemplary embodiment of ground engaging tip 32 shown in FIGS. 1-5 may be configured to be used when excavating and/or transferring abrasive work materials, such as, for example, work materials including a relatively high sand and/or rock content. For example, the exemplary embodiment shown in FIGS. 1-5 may be configured to exhibit improved resistance to wear in abrasive conditions relative to some other ground engaging tips.

Exemplary ground engaging tip 32 shown in FIGS. 1-5 includes a rear edge 46 including an upper rear edge 48 and a lower rear edge 50 separated by opposing side rear edges 52. Ground engaging tip 32 also includes a front edge 54 at a longitudinally opposite end of ground engaging tip 32 from rear edge 46. Ground engaging tip 32 also includes a top outer surface 56 extending from upper rear edge 48 toward front edge 54. For example, top outer surface 56 may extend to front edge 54. Exemplary ground engaging tip 32 also includes a bottom outer surface 58 extending from lower rear edge 50 toward front edge 54. For example, bottom outer surface 58 may extend to front edge 54. According to some embodiments, top outer surface 56 and bottom outer surface 58 may converge to form front edge 54. According to some embodiments, front edge 54 may be substantially straight in a direction substantially perpendicular to a longitudinal axis X of ground engaging tip 32. According to some embodiments, front edge 54 may include two or more edge segments that meet to form a slight point, for example, such that the two edge segments form a slight angle with respect to one another.

Figure 3:
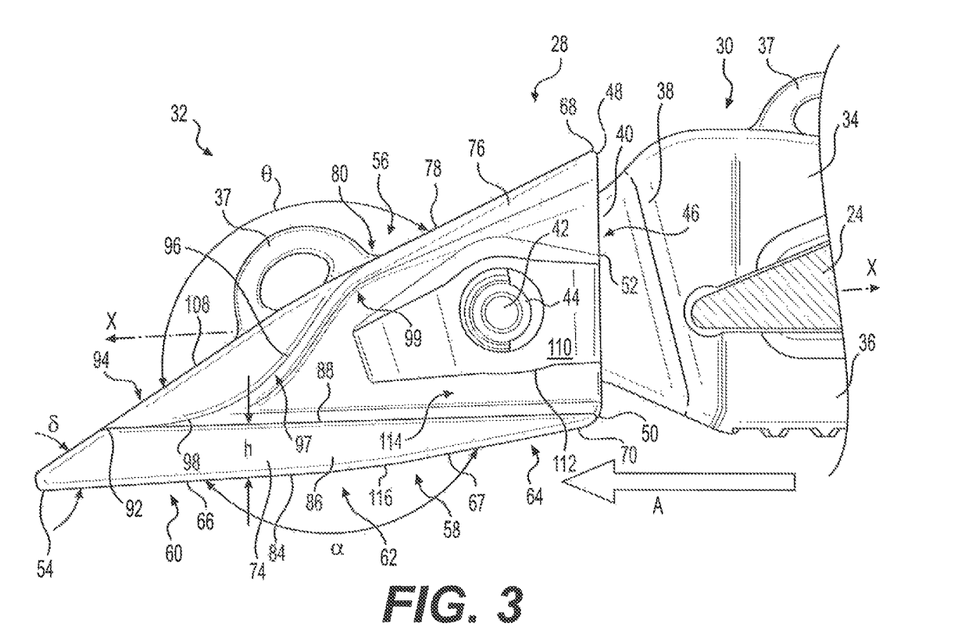
FIG. 3 is a side view of the exemplary embodiment shown in FIG. 2.

According to the exemplary embodiment shown in FIGS. 1-5, bottom outer surface 58 of ground engaging tip 32 includes a bottom surface front portion 60 extending from front edge 54 toward lower rear edge 50 and terminating at a bottom surface transition portion 62. According to some embodiments, bottom surface front portion 60 may be substantially planar. As shown in FIG. 3, bottom surface front portion 60 is parallel to longitudinal axis X of ground engaging tip 32. Exemplary bottom outer surface 58 also includes a bottom surface rear portion 64 extending from bottom surface transition portion 62 toward lower rear edge 50. According to the exemplary embodiment shown, bottom surface front portion 60 includes a front portion surface 66 extending in a first direction, and bottom surface rear portion 64 includes a rear portion surface 67 extending in a second direction.

For example, in the exemplary embodiment shown in FIG. 1-5, the first direction and the second direction define an angle α, such that bottom surface rear portion 64 extends toward top outer surface 56. According to some embodiments, bottom surface rear portion 64 may be substantially planar and/or may extend in a substantially uninterrupted manner toward top outer surface 56 and may terminate at lower rear edge 50. For example, bottom surface transition portion 62 may curve through a corner or an arc, such that the first direction and the second direction define an angle α ranging from 181° to 220°. For example, angle α may range from 181° to 200°, or from 181° to 190°. For example, angle α may range from 184° to 190°. The magnitude of angle α may be selected based on parameters, such as, for example, the desired fit between ground engaging tip 32 and adapter 30, the amount of material forming ground engaging tip 32 to provide desired longevity of wear, the effect of the flow of work material as ground engaging tip 32 penetrates the work material and/or as ground engaging tip 32 is withdrawn from the work material, and the effect of the flow of work material as ground engaging tip 32 is dragged backwards (i.e., in a direction opposite the front edge).

For example, as shown in FIG. 3, with bottom surface front portion 60 and longitudinal axis X as references, bottom surface rear portion 64 forms angle α ranging from 184° to 190° with respect to bottom surface front portion 60 and longitudinal axis X This tapering of bottom outer surface 58 toward top outer surface 56 as ground engaging tip 32 extends toward rear edge 46 may result in reduced resistance to work material flow as ground engaging tip 32 is dragged backwards (e.g., as shown in FIG. 3 with work material flowing in the direction of arrow A). In addition, this exemplary tapered configuration may also result in increased service life for ground engaging tip 32 by reducing wear of bottom surface rear portion 64 resulting from dragging ground engaging tip 32 backwards.

In the exemplary embodiment shown in FIGS. 1-5, upper rear edge 48 has an upper rear edge width $W_{URE}$ between opposing upper rear edge corners 68, and lower rear edge 50 has a lower rear edge width $W_{LRE}$ between opposing lower rear edge corners 70. Exemplary front edge 54 has a front edge width $W_{FE}$ between opposing front edge corners 72. According to the exemplary embodiment shown in FIGS. 1-5, front edge width $W_{FE}$ is larger than lower rear edge width $W_{LRE}$. According to some embodiments, upper rear edge width $W_{URE}$ may be substantially the same, greater than, or less than lower rear edge width $W_{LRE}$, depending on, for example, desired characteristics of ground engaging tip 32.

In the exemplary embodiment shown in FIGS. 1-5, ground engaging tip 32 includes opposing lower side flanges 74 extending from respective front edge corners 72 to respective lower rear edge corners 70. Exemplary lower side flanges 74 extend laterally relative to respective opposing lateral surfaces 76 of ground engaging tip 32. For example, top outer surface 56 includes a top surface rear portion 78 extending from upper rear edge 48 toward front edge 54 and terminating at a top surface transition portion 80. According to some embodiments, top surface rear portion 78 may be substantially planar. Exemplary top surface rear portion 78 includes opposing top surface lateral edges 82 extending from respective upper rear edge corners 68 toward front edge 54. Opposing lateral surfaces 76 extend from respective top surface lateral edges 82 toward bottom outer surface 58. According to some embodiments, lateral surfaces 76 may be substantially planar. Exemplary lower side flanges 74 include respective lower flange edges 84 extending from respective front edge corners 72 toward respective lower rear edge corners 70. Exemplary lower side flanges 74 also include respective lateral flange surfaces 86 extending from respective lower flange edges 84 toward top outer surface 56 and terminating at upper flange edges 88. According to some embodiments, lateral flange surfaces 86 may be substantially planar. Exemplary lower side flanges 74 further include respective return surfaces 90 extending from respective upper flange edges 88 to respective lateral surfaces 76. According to some embodiments, return surfaces 90 may be substantially planar. According to some embodiments, for example, as shown, upper flange edges 88 terminate at an intermediate point 92 short of reaching front edge 54.

For example, as shown in FIG. 3, using bottom surface front portion 60 and longitudinal axis X as references, the height h of lateral flange surfaces 86 tapers as lower sides flanges 74 extend toward rear edge 46 of ground engaging tip 32. For example, upper flange edges 88 are substantially parallel (within plus or minus 5°) with respect to bottom surface front portion 60 and longitudinal axis X This exemplary configuration results in lower side flanges 74 tapering as they extend toward rear edge 46. This may result in reduced resistance to work material flow as ground engaging tip 32 is dragged backwards. In addition, this exemplary tapered configuration may also result in increased service life for ground engaging tip 32 by reducing wear of bottom surface rear portion 64 resulting from dragging ground engaging tip 32 backwards.

Figure 4:
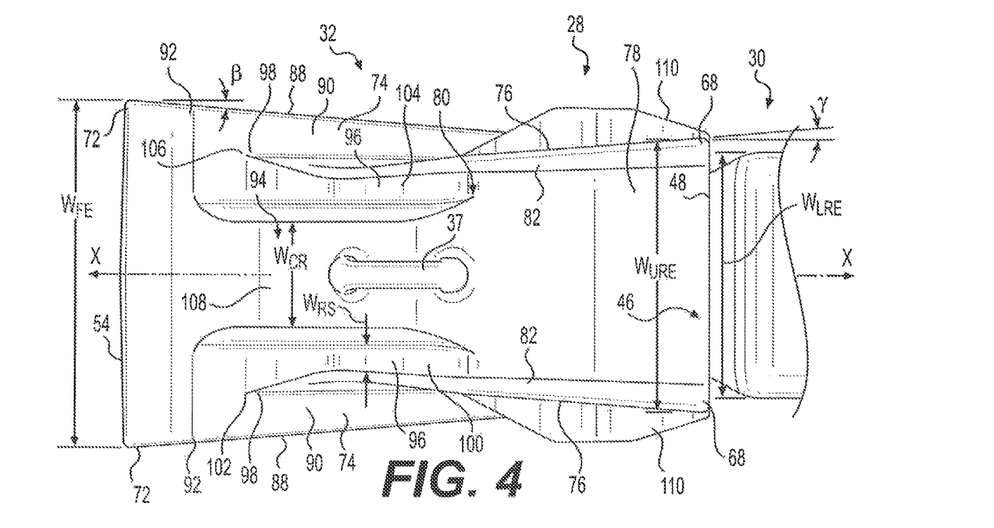
FIG. 4 is a top view of the exemplary embodiment shown in FIG. 2.

As shown in FIG. 4, exemplary lower slide flanges 74 also taper as they extend from front edge corners 72 toward lower rear edge corners 70. For example, lateral flange surfaces 86 form an angle β relative to longitudinal axis X ranging from 1° to 10°, such as, for example, from 3° to 7°. The magnitude of angle β may be selected based on parameters, such as, for example, the desired fit between ground engaging tip 32 and adapter 30, the amount of material forming ground engaging tip 32 to provide desired longevity of wear, the effect of the flow of work material as ground engaging tip 32 penetrates the work material and/or as ground engaging tip 32 is withdrawn from the work material, and the effect of the flow of work material as ground engaging tip 32 is dragged backwards (i.e., in a direction opposite the front edge).

As shown in FIG. 4, exemplary lateral surfaces 76 taper as they extend from upper rear edge corners 68 toward front edge corners 72. For example, lateral surfaces 76 form an angle γ relative to longitudinal axis X ranging from 1° to 10°, such as, for example, from 3° to 7°. This exemplary tapering of lateral surfaces 76 may assist with the penetration of ground engaging tip 32 into the work material.

In the exemplary embodiment shown in FIGS. 1-5, top outer surface 56 includes a top surface front portion 94 extending from top surface transition portion 80 to front edge 54. As shown in FIG. 3, with bottom surface front portion 60 and longitudinal axis X as references, top surface front portion 94 forms an angle δ with respect to bottom surface front portion and longitudinal axis X ranging, for example, from 20° to 40°, from 25° to 35°, or from 28° to 32°. Angle δ may be selected based on parameters, such as, for example, desired ease of penetration into work material and/or desired wear life. As shown in FIG. 3, exemplary top surface front portion 94 forms an angle θ with respect to top surface rear portion 78 ranging, for example, from 181° to 195°, from 181°to 190°, or from 186° to 190°. This results in top outer surface 56 tapering as it extends toward rear edge 46 of ground engaging tip 32. This exemplary configuration may improve ease of penetration of ground engaging tip 32 into the work material.

According to some embodiments, top surface front portion 94 includes opposing recessed relief surfaces 96 extending from top surface transition portion 80 toward front edge 54 and terminating at respective relief ends 98. For example, recessed relief surfaces 96 include a first recessed relief surface 100 terminating at a first relief end 102, and a second recessed relief surface 104 extending from top surface transition portion 80 toward front edge 54 and terminating at a second relief end 106.

Exemplary recessed relief surfaces 96 shown in FIGS. 1-5 include a curved concave portion 97 and a curved convex portion 99. For example, as shown in FIG. 3, concave portion 97 is generally configured as an arc of a circle with one end terminating substantially tangent with respect to return surfaces 90 of lower side flanges 74 and the other end transitioning into convex portion 99. According to some embodiments, the circle may have a radius ranging, for example, from 20% to 50% of the distance from front edge 54 to upper rear edge 48 of ground engaging tip 32. For example, the radius may range from 25% to 40%, from 25% to 35%, or from 30% to 35%, of the distance from front edge 54 to upper rear edge 48 of ground engaging tip 32.

According to some embodiments, recessed relief surfaces 96 may be configured to substantially maintain the sharpness of ground engaging tip 32 as it wears. According to some embodiments, recessed relief surfaces 96 may be configured to guide work material over ground engaging tooth assembly 28 and into bucket 12.

Figure 5:
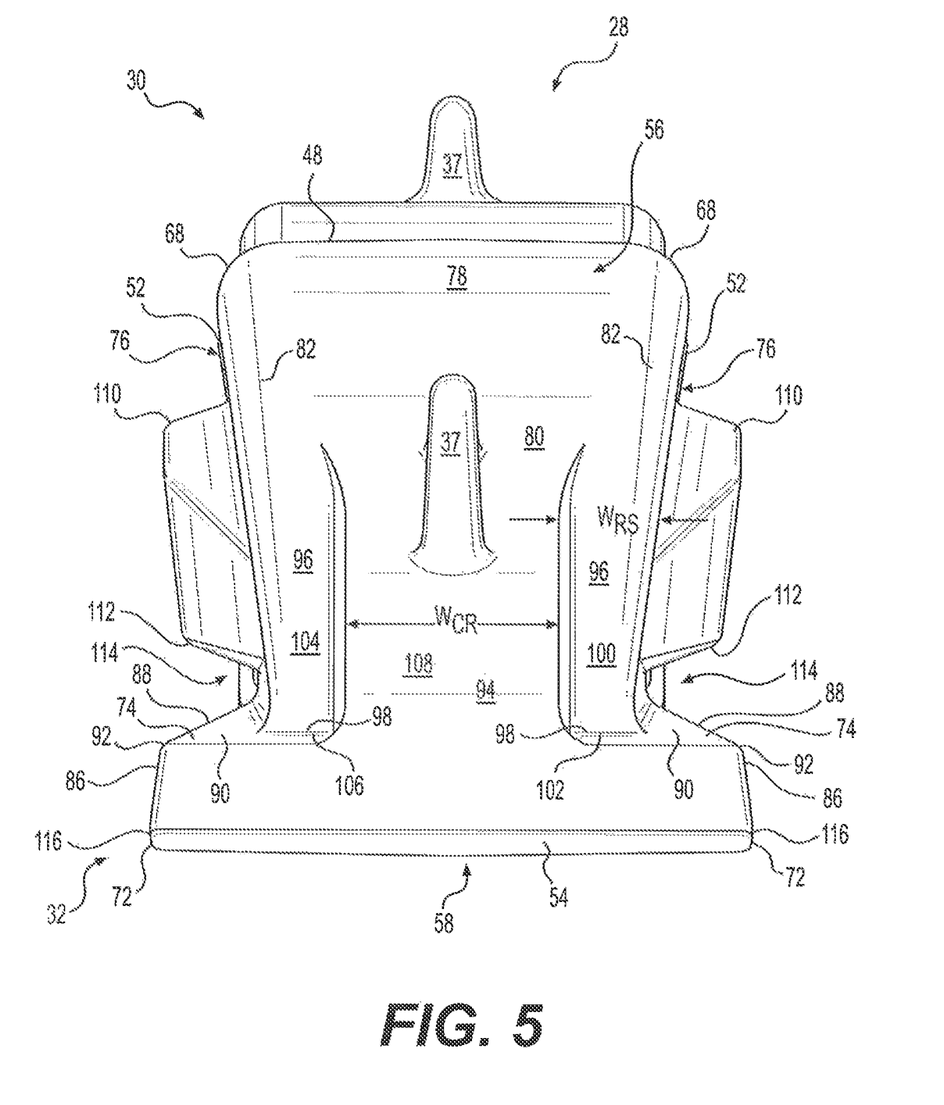
FIG. 5 is a front view of the exemplary embodiment shown in FIG. 2.

In the exemplary embodiment shown in FIGS. 1-5, first and second recessed relief surfaces 100 and 104 are separated from one another by a center rib 108 extending from top surface transition portion 80 toward front edge 54. According to some embodiments, for example, as shown in FIG. 5, center rib 108 may have a width $W_{CR}$, and recessed relief surfaces 96 may have a combined average width (i.e., the sum of the average widths $W_{RS}$ of each of first and second recessed relief surfaces 100 and 104), such that the combined average widths $W_{RS}$ range from 50% to 90% of width $W_{CR}$ of center rib 108. For example, the combined average widths $W_{RS}$ may range from 60% to 80% of width $W_{CR}$, from 65% to 75%, or from 70% to 75% of width $W_{CR}$.

According to some embodiments, center rib 108 may be configured to increase the strength of ground engaging tip 32, while recessed relief surfaces 96 may provide a configuration for improving material flow around ground engaging tip 32. The relative widths of center rib 108 and recessed relief surfaces 96 may be selected based on parameters, such as, for example, the strength of ground engaging tip 32 and desired material flow past ground engaging tip 32.

According to some embodiments, first and second recessed relief surfaces 100 and 104 terminate short of reaching front edge 54. According to some embodiments, first and second recessed relief surfaces 102 and 104, and lower side flanges 74 terminate short of front edge 54, for example, such that a chisel is formed by center rib 108 and front edge 54, with the chisel being wider at front edge 54 than center rib 108. According to some embodiments, the chisel and center rib 108 may share a common plane, for example, as Shown in FIGS. 2-5. The exemplary chisel configuration may improve penetration of ground engaging tip 32 into the work material, while also providing more material to increase service life as ground engaging tip 32 wears from use.

The exemplary embodiment shown in FIGS. 1-5 also includes opposing retention lobes 110 surrounding respective retention apertures 44. Exemplary retention lobes 110 protrude from respective lateral surfaces 76 and serve to protect retention apertures 44 and/or projections 42 of adapter 30 from damage resulting from the work material flowing past ground engaging tip 32 as ground engaging tip 32 penetrates and is removed from the work material. This may enable ground engaging tip 32 to be selectively secured to and removed from adapter 30, even after ground engaging tip 32 is worn to a condition suggesting replacement. In the exemplary embodiment shown, retention lobes 110 include lower lobe edges 112, and lower side flanges 74 and lower lobe edges 112 of respective retention lobes 110 define respective channels 114 through which the work material may pass. For example, lower lobe edges 112 and return surfaces 90 of lower side flanges 74 may be configured to be generally parallel, thereby promoting the passage of work material through channels 114.

Although exemplary retention lobe 110 is shown as part of exemplary ground engaging tooth assembly 28 and exemplary ground engaging tip 32 shown in FIGS. 1-5, retention lobe 110 may be used with, or part of, ground engaging tooth assemblies and ground engaging tips having different configurations.

Figure 6:
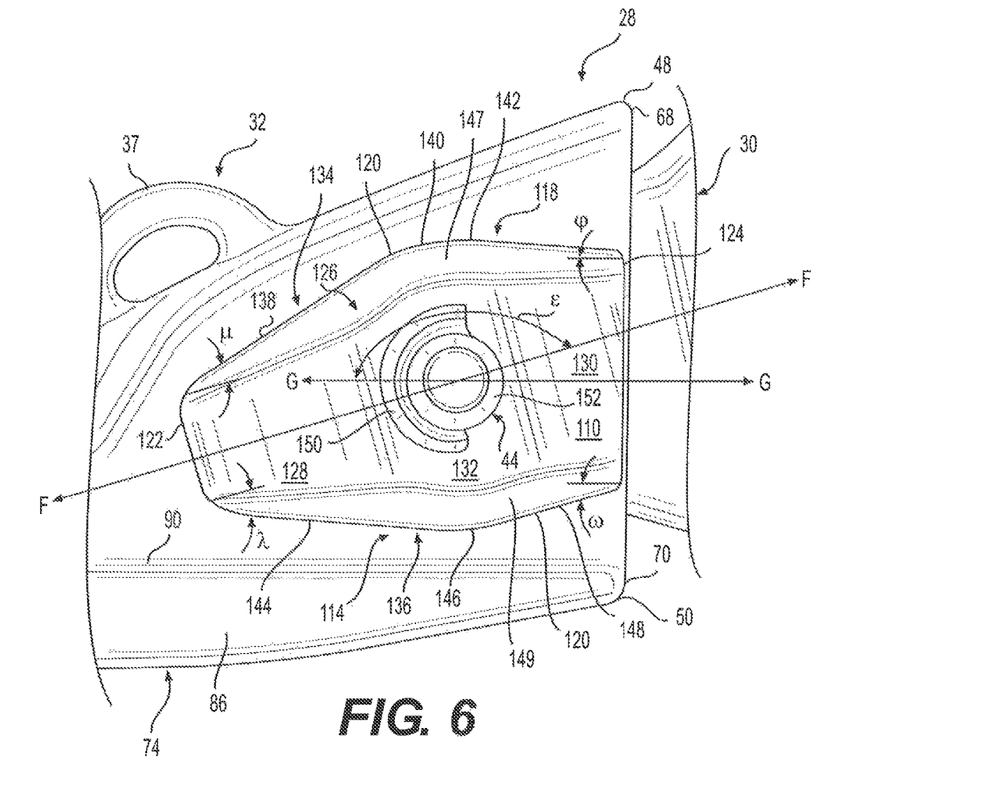
FIG. 6 is a detailed side view of an exemplary embodiment of a retention lobe.
Figure 7:
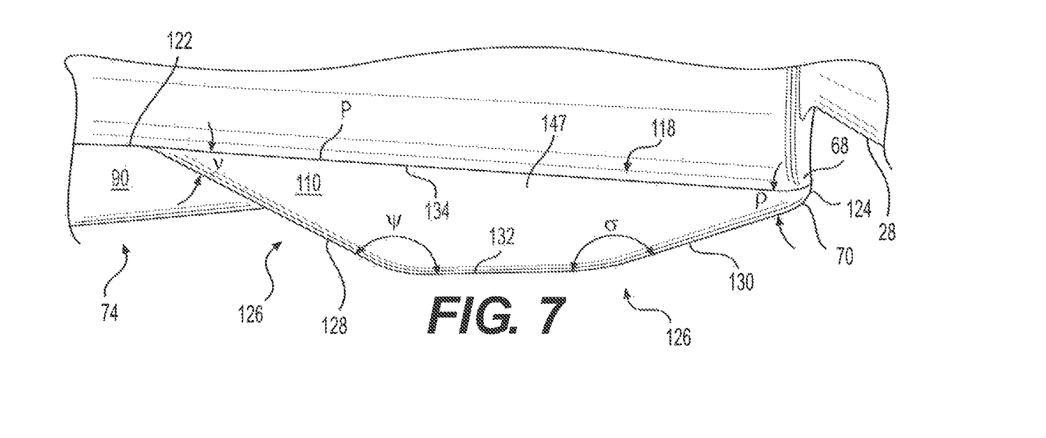
FIG. 7 is a detailed top view of the exemplary retention lobe shown in FIG. 6.
Figures 8, 9:
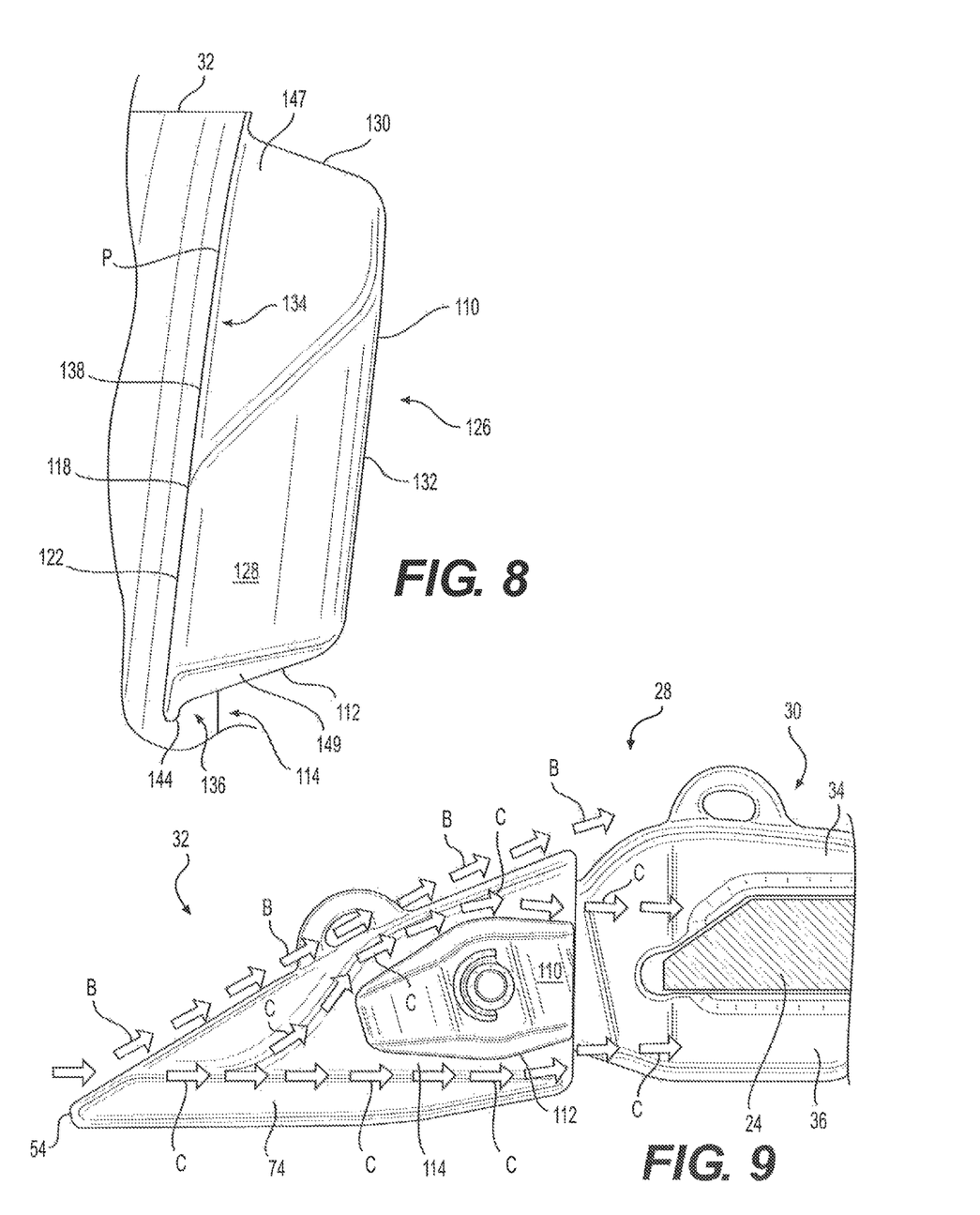
FIG. 8 is a detailed front view of the exemplary retention lobe shown in FIG. 6.
FIG. 9 is a side view of an exemplary ground engaging tooth assembly showing the flow of work material over and around the ground engaging tooth assembly.

As shown in FIGS. 6-8, exemplary retention lobe 110 may include a lobe base 118 having a base outline 120. According to the exemplary embodiment shown in FIGS. 6-8, at least a portion of base outline 120 lies in a base plane P (see, e.g., FIG. 7). Exemplary base outline 120 includes a front base edge 122 and a rear base edge 124 opposite front base edge 122. Exemplary retention lobe 110 also includes a lobe outer surface 126 spaced from lobe base 118 and extending from front base edge 122 to rear base edge 124. As shown in FIGS. 6-8, lobe outer surface 126 includes a front lobe outer surface 128 extending from front base edge 122 obliquely relative to base plane P and toward rear base edge 124. Lobe outer surface 126 also includes a rear lobe outer surface 130 extending obliquely relative to front lobe outer surface 128, such that rear lobe outer surface 130 tapers relative to front lobe outer surface 128 toward base plane P. According to some embodiments, for example, as shown in FIGS. 6 and 7, lobe outer surface 126 may also include an intermediate lobe outer surface 132 spaced from base plane P and extending obliquely from front lobe outer surface 128. Rear lobe outer surface 130 may extend obliquely from intermediate lobe outer surface 132 and terminate at rear base edge 124, such that rear lobe outer surface 130 tapers from intermediate lobe outer surface 132 toward base plane P. According to some embodiments, one or more of front lobe outer surface 128, intermediate lobe outer surface 132, and rear lobe outer surface 130, may be substantially planar, except where front lobe outer surface 128, intermediate lobe outer surface 132, and rear lobe outer surface 130 meet one another, where a transition between the lobe outer surfaces may form a corner or a curved transition.

In the exemplary embodiment shown in FIGS. 6-8, at least one of front base edge 122 and rear base edge 124 lies in base plane P. For example, in the exemplary embodiment shown, both front base edge 122 and rear base edge 124 lie in base plane P. Exemplary base outline 120 also includes an upper side edge 134 and a lower side edge 136 opposite upper side edge 134. Exemplary upper and lower side edges 134 and 136 each extend from front base edge 122 to rear base edge 124. At least one of upper side edge 134 and lower side edge 136 lies in base plane P. For example, both upper side edge 134 and lower side edge 136 lie in base plane P.

According to the exemplary embodiment shown in FIGS. 6-8, upper and lower side edges 134 and 136 are not straight. For example, relative to an axis F perpendicular to front base edge 122, upper side edge 134 includes a front upper side edge 138 extending obliquely from front base edge 122 toward rear base edge 124 at an acute angle $\mu$ relative axis F. Exemplary upper side edge 134 also includes an upper curved transition edge 140 and a rear upper side edge 142, with rear upper side edge 142 extending obliquely relative to an axis G perpendicular to rear base edge 124. In the exemplary embodiment shown, rear upper side edge 142 meets rear base edge 124 at an acute angle $\phi$ relative to axis G. Exemplary lower side edge 136 includes a front lower side edge 144 extending obliquely from front base edge 122 toward rear base edge 124 at an acute angle $\lambda$ relative axis F. Exemplary lower side edge 136 also includes a lower curved transition edge 146 and a rear lower side edge 148, with rear lower side edge 148 extending obliquely relative to axis G. In the exemplary embodiment shown, rear lower side edge 148 meets rear base edge 124 at an acute angle $\omega$ relative to axis G. Angle $\mu$ may range from 10° to 30°, for example, from 15° to 20°. Angle $\phi$ may range from zero to 10°, for example, from zero to 5°. Angle $\lambda$ may range from 15° to 30°, for example, from 20° to 25°. Angle $\omega$ may range from 10° to 30°, for example, from 15° to 20°.

According to some embodiments, lobe outer surface 126 may substantially correspond to base outline 120, for example, as viewed perpendicular to base plane P, as shown in FIG. 6, except that lobe outer surface 126 is slightly smaller than base outline 120. For example, the leading edge of front lobe outer surface 128 may be substantially coincident with front base edge 122, and the trailing edge of rear lobe outer surface 130 may be substantially coincident with rear base edge 124. However, as shown in FIG. 6, front lobe outer surface 128, intermediate lobe outer surface 132, and rear lobe outer surface 130, viewed perpendicular to base plane P, do not extend completely to upper side edge 134 and lower side edge 136. Rather, an upper side face 147 may extend in a tapered manner between lobe outer surface 126 and upper side edge 134, and a lower side face 149 may extend in a tapered manner between lobe outer surface 126 and lower side edge 136.

According to the exemplary embodiment shown, axis F and axis G are oblique with respect to one another. For example, axis F and axis G may form an angle $\epsilon$ with respect to one another ranging from 155° to 175°, for example, from 160° to 170°. According to some embodiments, axis F and axis G are parallel and/or co-linear with respect to one another.

As shown in FIGS. 6-8, exemplary retention lobe further includes retention aperture 44 extending through retention lobe 110. According to some embodiments, retention aperture 44 extends through intermediate lobe outer surface 132. Exemplary retention aperture 44 includes a front aperture portion 150 and a rear aperture portion 152. Exemplary front aperture portion 150 is semi-circular, and exemplary rear aperture 152 portion is semi-circular, with front aperture portion 150 having a larger diameter than rear aperture portion 152. Other configurations of retention aperture 44 are contemplated.

According to some embodiments, a cross-section of exemplary retention lobe 110 perpendicular to base plane P includes at least three sides. For example, front lobe outer surface 128 and the rear lobe outer surface 130 may define at least two of the at least three sides, with base plane P defining an additional side. According to some embodiments, the cross-section of exemplary retention lobe 110 perpendicular to base plane P includes at least four sides. For example, as shown in FIG. 7, the cross-section of retention lobe 110 perpendicular to base plane P includes four sides, with base plane P defining an additional side. For example, front lobe outer surface 128, intermediate lobe outer surface 132, and rear lobe outer surface 130 define at least three of the four sides. As shown, the cross-section of exemplary retention lobe 110 includes two acute angles $\nu$ and $\rho$, and two obtuse angles $\psi$ and $\sigma$, and the two obtuse angles are defined by front lobe outer surface 128, intermediate lobe outer surface 132, and rear lobe outer surface 130. In the exemplary embodiment shown, front base edge 122 and rear base edge 124 are oblique with respect to one another as viewed perpendicular to base plane P. For example, front base edge 122 and rear base edge 124 may define an angle with respect to one another ranging from 5° to 25°, for example, from 10° to 20°.

As shown in FIG. 7, front lobe outer surface 128 and intermediate lobe outer surface 132 define obtuse angle $\psi$, and intermediate lobe outer surface 132 and rear lobe outer surface 130 define obtuse angle $\sigma$. Angle $\psi$ may range from 140° to 160°, for example, from 145° to 155°. Angle $\sigma$ may range from 145° to 175°, for example, from 155° to 165°. Front lobe outer surface 128 and base plane P define acute angle $\nu$, and rear lobe outer surface 130 and base plane P define acute angle $\rho$. Angle $\nu$ may range from 15° to 30°, for example, from 20° to 25°. Angle $\rho$ may range from 15° to 30°, for example, from 20° to 25°.

According to some embodiments, at least one of front lobe outer surface 128, intermediate lobe outer surface 132, and rear lobe outer surface 130 may include abrasive resistant material. For example, one or more of front lobe outer surface 128, intermediate lobe outer surface 132, and rear lobe outer surface 130 may include a coating (partial or complete) of abrasive resistant material configured to improve the service life of retention lobe 110. For example, front lobe outer surface 128 may include a coating of abrasive resistant material. According to some embodiments, only a portion of front lobe outer surface 128 may include a coating of abrasive resistant material. Abrasive resistive materials may include at least one of ceramics, alumina ceramics, silicon carbide ceramics, zirconia ceramics, cast basalt, tungsten carbides, hardened metals, weld overlays, and any other materials known to exhibit resistance to abrasion.

According to some embodiments, at least one of front lobe outer surface 128, intermediate lobe outer surface 132, and rear lobe outer surface 130 may include markings representative of, for example, at least one of branding (or part origin), part identification, and/or part revision number (e.g., identification of the version of the part). For example, front lobe outer surface 128 may include markings indicative of branding, and rear lobe outer surface 130 may include markings indicative of part identification and/or part revision number.

FIG. 9 is a side view of an exemplary ground engaging tooth assembly 28 showing exemplary flow of work material over and around ground engaging tooth assembly 28. As represented by arrows B, as ground engaging tooth assembly 28 penetrates into the work material, a portion of the work material flows over ground engaging tip 32, over adapter 30, over base edge 24, and into bucket 12. As represented by arrows C, a portion of the work material that does not flow over ground engaging tooth assembly 28, instead flows around ground engaging tooth assembly 28. As shown, exemplary retention lobe 110 helps to direct flow around retention lobe 110 as shown, thereby promoting flow of work material away from (over and under) base edge 24 of bucket 12, such that wear of base edge 24 may be reduced. In the exemplary embodiment shown in FIG. 9, exemplary ground engaging tip 32 includes lower side flanges 74, which, in combination with exemplary retention lobes 110, create Channels 114 through which work material may flow, thereby assisting with direction of the work material under base edge 24. Such an exemplary configuration may further assist with reduction of wear of base edge 24 of bucket 12.

INDUSTRIAL APPLICABILITY

The exemplary retention lobes disclosed herein may be used with any ground engaging tooth assemblies for machines that include ground engaging implements, including implements configured to penetrate soil, sand, gravel, rock, and other materials. For example, the exemplary retention lobes may be used with ground engaging tooth assemblies for excavating implements and/or loading implements, such as, for example, buckets for loaders and/or excavators. According to some embodiments, the retention lobes may help improve the service life of the implement to which they are coupled. For example, they may help protect the base edge of the implement, for example, by directing work material (e.g., soil and/or rocks) over and around the base edge. According to some embodiments, the retention lobes may protect the retention system that couples the ground engaging tip to the adapter of the ground engaging tooth assembly. For example, the retention lobes may protect the retention system by directing work material away from the retention system. In addition, embodiments of retention lobes including an abrasive resistant material may be more resistant to wear and/or damage from the work material. According to some embodiments, the retention lobes may facilitate the placement of markings on the ground engaging tooth assembly relating to, for example, branding, part identification, and/or part revision number.

The disclosed retention lobes may be manufactured using conventional techniques, such as, for example, casting or molding. Alternatively, the disclosed retention lobes may be manufactured using conventional techniques generally referred to as additive manufacturing or additive fabrication. According to some embodiments, the retention lobes may be manufactured as a separate part from the ground engaging tip. According to some embodiments, the retention lobes may be manufactured as an integrated, single piece with a portion of, or all of, the ground engaging tip. Known additive manufacturing/fabrication processes include techniques, such as, for example, 3D printing. 3D printing is a process in which material may be deposited in successive layers under the control of a computer. The computer controls additive fabrication equipment to deposit the successive layers according to a three-dimensional model (e.g., a digital file, such as an AMF or STL, file) that is configured to be converted into a plurality of slices, for example, substantially two-dimensional slices, that each define a cross-sectional layer of the retention lobes in order to manufacture, or fabricate, the retention lobes. In one instance, the disclosed retention lobes would be an original component, and the 3D printing process would be utilized to manufacture the retention lobes. In other instances, the 3D process could be used to replicate existing retention lobes, and the replicated retention lobes could be sold as aftermarket parts. These replicated aftermarket retention lobes could be either exact copies of the original retention lobes or pseudo copies differing in only non-critical aspects.

Figure 10:
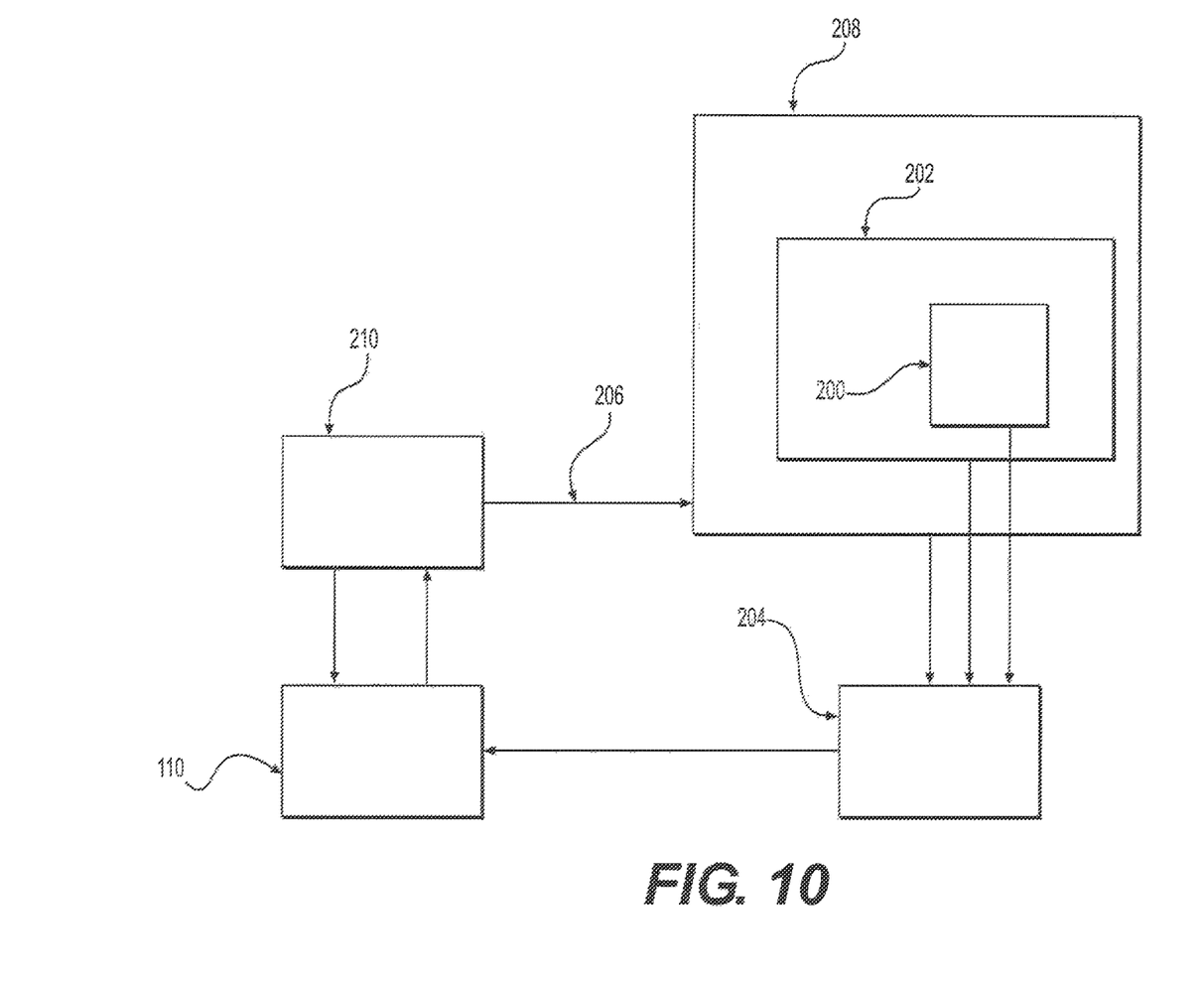
FIG. 10 is a schematic view representing an exemplary system for generating a three-dimensional model of a ground engaging tooth assembly.

With reference to FIG. 10, the three-dimensional model 200 used to represent an original retention lobe 110 may be on a computer-readable storage medium 202, such as, for example, magnetic storage including floppy disk, hard disk, or magnetic tape; semiconductor storage such as solid state disk (SSD) or flash memory; optical disc storage; magneto-optical disc storage; or any other type of physical memory on Which information or data readable by at least one processor may be stored. This storage medium may be used in connection with commercially available 3D printers 204 to manufacture, or fabricate, the retention lobe. Alternatively, the three-dimensional model may be transmitted electronically to the 3D printer 204 in a streaming fashion without being permanently stored at the location of the 3D printer 204. In either instance, the three-dimensional model constitutes a digital representation of the retention lobes suitable for use in manufacturing the retention lobes.

The three-dimensional model may be formed in a number of known ways. In general, the three-dimensional model is created by inputting data 206 representing the retention lobes to a computer or a processor 208, such as a cloud-based software operating system. The data may then be used as a three-dimensional model representing the physical retention lobes. The three-dimensional model is intended to be suitable for the purposes of manufacturing the retention lobes. In an exemplary embodiment, the three-dimensional model is suitable for the purpose of manufacturing the retention lobes by an additive manufacturing technique.

In the exemplary embodiment shown in FIG. 10, the inputting of data may be achieved with a 3D scanner 210. The method may involve contacting retention lobe 110 via a contacting and data receiving device, and receiving data from the contacting in order to generate the three-dimensional model. For example, 3D scanner 210 may be a contact-type scanner. The scanned data may be imported into a 3D modeling software program to prepare a digital data set in some embodiments, the contacting may occur via direct physical contact using a coordinate measuring machine that measures the physical structure of retention lobe 110 by contacting a probe with the surfaces of retention lobe 110 in order to generate a three-dimensional model. In other embodiments, the 3D scanner 210 may be a non-contact type scanner, and the method may include directing projected energy (e.g., light or ultrasonic energy) onto retention lobe 110 to be replicated and receiving the reflected energy. From this reflected energy, a computer may be used to generate a computer readable three-dimensional model for use in manufacturing retention lobe 110. In various embodiments, multiple two-dimensional images may be used to create a three-dimensional model. For example, 2D slices of a 3D object may be combined to create the three-dimensional model. In lieu of a 3D scanner, the inputting of data may be performed using computer-aided design (CAD) software. In such instances, the three-dimensional model may be formed by generating a virtual 3D model of the disclosed retention lobe 110 using the CAD software. A three-dimensional model may be generated from the CAD virtual 3D model in order to manufacture retention lobe 110.

The additive manufacturing process utilized to create the disclosed retention lobes may involve materials, such as, for example, plastic, rubber, metal, etc. In some embodiments, additional processes may be performed to create a finished product. Such additional processes may include, for example, one or more of cleaning, hardening, heat treatment, material removal, and polishing. Other processes necessary to complete a finished product may be performed in addition to or in lieu of these identified processes.

It will be apparent to those skilled in the art that various modifications and variations can be made to the exemplary disclosed retention lobes. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A retention lobe for a ground engaging tip, the retention lobe comprising:
    a lobe base having a base outline, wherein at least a portion of the base outline lies in a base plane, wherein the base outline includes a front base edge and a rear base edge opposite the front base edge; and
    a lobe outer surface spaced from the lobe base and extending from the front base edge to the rear base edge, wherein the lobe outer surface includes:
    a front lobe outer surface extending from the front base edge obliquely relative to the base plane and toward the rear base edge;
    an intermediate lobe outer surface spaced from the base plane and extending obliquely from the front lobe outer surface;
    a retention aperture extending through the intermediate lobe outer surface of the retention lobe; and
    a rear lobe outer surface extending obliquely from the intermediate lobe outer surface and terminating at the rear base edge, such that the rear lobe outer surface tapers from the intermediate lobe outer surface toward the base plane, wherein a cross-section of the retention lobe includes an obtuse angle defined between the front lobe outer surface and the intermediate lobe outer surface and an obtuse angle defined between the intermediated lobe outer surface and the rear lobe outer surface.

2. The retention lobe of claim 1, wherein at least one of the front base edge and the rear base edge lies in the base plane.

3. The retention lobe of claim 1, wherein the base outline further includes an upper side edge and a lower side edge opposite the upper side edge, the upper and lower side edges each extending from the front base edge to the rear base edge.

4. The retention lobe of claim 3, wherein at least one of the upper side edge and the lower side edge lies in the base plane.

5. The retention lobe of claim 1, wherein a cross-section of the retention lobe perpendicular to the base plane includes at least four sides.

6. The retention lobe of claim 5, wherein the front lobe outer surface, the intermediate lobe outer surface, and the rear lobe outer surface define at least three of the four sides.

7. The retention lobe of claim 5, wherein the cross-section includes two acute angles and two obtuse angles, and wherein the two obtuse angles are defined by the front lobe outer surface, the intermediate lobe outer surface, and the rear lobe outer surface.

8. The retention lobe of claim 1, wherein the front base edge and the rear base edge are oblique with respect to one another as viewed perpendicular to the base plane.

9. The retention lobe of claim 1, wherein at least one of the front lobe outer surface, the intermediate lobe outer surface, and the rear lobe outer surface includes abrasive resistant material.

10. A method of creating a computer-readable three-dimensional model suitable for use in manufacturing the retention lobe of claim 1, the method comprising:
    inputting data representing the retention lobe to a computer; and
    using the data to represent the retention lobe as a three-dimensional model, the three dimensional model being suitable for use in manufacturing the retention lobe.

11. The method of claim 10, wherein the inputting of data includes one or more of using a contact-type 3D scanner to contact the retention lobe, using a non-contact 3D scanner to project energy onto the retention lobe and receive reflected energy, and generating a virtual three-dimensional model of the retention lobe using computer-aided design (CAD) software.

12. A computer-readable three-dimensional model suitable for use in manufacturing the retention lobe of claim 1.

13. A computer-readable storage medium having data stored thereon representing a three-dimensional model suitable for use in manufacturing the retention lobe of claim 1.

14. A method for manufacturing the retention lobe of claim 1, the method comprising the steps of:
    providing a computer-readable three-dimensional model of the retention lobe, the three-dimensional model being configured to be converted into a plurality of slices that each define a cross-sectional layer of the retention lobe; and
    successively forming each layer of the retention lobe by additive manufacturing.

15. A retention lobe for a ground engaging tip, the retention lobe comprising:
    a lobe base having a base outline, wherein at least a portion of the base outline lies in a base plane, wherein the base outline includes a front base edge and a rear base edge opposite the front base edge; and
    a lobe outer surface spaced from the lobe base and extending from the front base edge to the rear base edge, wherein the lobe outer surface includes:
    a front lobe outer surface extending from the front base edge obliquely relative to the base plane and toward the rear base edge;
    an intermediated lobe outer surface spaced from the base plane and extending obliquely from the front lobe outer surface;
    a retention aperture extending through the intermediate lobe outer surface of the retention lobe; and
    a rear lobe outer surface extending obliquely relative to the front lobe outer surface and the intermediated lobe outer surface, such that the rear lobe outer surface tapers relative to the front lobe outer surface and the intermediate lobe outer surface toward the base plane, wherein a cross-section of the retention lobe includes an obtuse angle defined between the front lobe outer surface and the intermediate lobe outer surface and an obtuse angle defined between the intermediated lobe outer surface and the rear lobe outer surface.

16. The retention lobe of claim 15, wherein the base outline further includes an upper side edge and a lower side edge opposite the upper side edge, the upper and lower side edges each extending from the front base edge to the rear base edge.

17. The retention lobe of claim 16, wherein the upper side edge includes a front upper side edge and a rear upper side edge, and the lower side edge includes a front lower side edge and a rear lower side edge.

18. The retention lobe of claim 15, wherein a cross-section of the retention lobe perpendicular to the base plane includes at least three sides.

19. The retention lobe of claim 18, wherein the front lobe outer surface and the rear lobe outer surface define at least two of the three sides.

20. The retention lobe of claim 15, wherein the lobe outer surface includes abrasive resistant material.

21. A retention lobe for a ground engaging tip, the retention lobe comprising:
   a lobe base having a base outline, wherein at least a portion of the base outline lies in a base plane, wherein the base outline includes a front base edge and a rear base edge opposite the front base edge; and
   a lobe outer surface spaced from the lobe base and extending from the front base edge to the rear base edge, wherein the lobe outer surface includes:
      a front lobe outer surface extending from the front base edge obliquely relative to the base plane and toward the rear base edge;
      an intermediated lobe outer surface spaced from the base plane and extending obliquely from the front lobe outer surface;
      a retention aperture extending through the intermediate lobe outer surface of the retention lobe; and
      a rear lobe outer surface extending obliquely relative to the front lobe outer surface and the intermediate lobe outer surface, such that the rear lobe outer surface tapers relative to the front lobe outer surface and the intermediated lobe outer surface toward the base plane, wherein a cross-section of the retention lobe includes an obtuse angle defined between the front lobe outer surface and the intermediate lobe outer surface and an obtuse angle defined between the intermediated lobe outer surface and the rear lobe outer surface; and
   wherein at least one of the front lobe outer surface, the intermediate lobe outer surface and the rear lobe outer surface includes abrasive resistant material.

22. The retention lobe of claim 21, wherein at least one of the front lobe outer surface and the rear lobe outer surface includes at least a partial coating of the abrasive resistant material.

23. The retention lobe of claim 21, wherein the abrasive resistant material includes at least one of ceramics, alumina ceramics, silicon carbide ceramics, zirconia ceramics, cast basalt, tungsten carbides, hardened metals, and weld overlays.

* * * * *